US010143610B2

(12) United States Patent
Wakabayashi et al.

(10) Patent No.: US 10,143,610 B2
(45) Date of Patent: Dec. 4, 2018

(54) INCUBATOR WITH ILLUMINATION

(71) Applicant: ATOM MEDICAL CORPORATION, Tokyo (JP)

(72) Inventors: Keisuke Wakabayashi, Saitama (JP); Naoki Suzuki, Saitama (JP); Shinsuke Sakuma, Saitama (JP); Keisuke Takarada, Saitama (JP); Ichiro Matsubara, Tokyo (JP); Terumi Matsubara, Tokyo (JP)

(73) Assignee: ATOM MEDICAL CORPORATION, Tokyo (JP)

(*) Notice: Subject to any disclaimer, the term of this patent is extended or adjusted under 35 U.S.C. 154(b) by 114 days.

(21) Appl. No.: 15/352,874

(22) Filed: Nov. 16, 2016

(65) Prior Publication Data

US 2017/0135888 A1 May 18, 2017

(30) Foreign Application Priority Data

Nov. 18, 2015 (JP) ................................ 2015-225488

(51) Int. Cl.

*A61G 11/00* (2006.01)
*F21V 7/00* (2006.01)
*F21V 7/04* (2006.01)
*F21V 33/00* (2006.01)
*F21V 8/00* (2006.01)

(Continued)

(52) U.S. Cl.

CPC ............ *A61G 11/009* (2013.01); *A61G 11/00* (2013.01); *A61G 11/004* (2013.01); *A61G 11/006* (2013.01); *F21V 7/0008* (2013.01); *F21V 7/04* (2013.01); *F21V 33/0068* (2013.01); *G02B 6/0008* (2013.01); *F21V 29/70* (2015.01); *F21W 2131/20* (2013.01); *F21Y 2115/10* (2016.08)

(58) Field of Classification Search

CPC .... A61G 11/00; A61G 11/004; A61G 11/006; A61G 11/009

See application file for complete search history.

(56) References Cited

U.S. PATENT DOCUMENTS 6,402,681 B1 6/2002 McDonough et al.
2004/0236174 A1* 11/2004 Boone ................. A61B 5/6892 600/21

(Continued)

FOREIGN PATENT DOCUMENTS

EP 2 179 718 4/2010
JP 7-98176 4/1995

(Continued)

OTHER PUBLICATIONS

Extended European Search Report dated Mar. 17, 2017 in corresponding European Application No. 16193893.1.

(Continued)

*Primary Examiner* — Christine H Matthews

(74) *Attorney, Agent, or Firm* — Wenderoth, Lind & Ponack, L.L.P.

(57) ABSTRACT

An incubator includes: a transparent hood, covering an accommodating space configured to accommodate a baby; an illumination light source, disposed so as to avoid disturbing observation of the baby through the transparent hood, and an emitting member, fixed to the transparent hood, and configured to emit light from the illumination light source, so as to illuminate the accommodating space.

10 Claims, 2 Drawing Sheets

3a
4
10
3b
3
13
6
6
9
2
15
15

(51) Int. Cl.

| | |
|---|---|
| *F21V 29/70* | (2015.01) |
| *F21Y 115/10* | (2016.01) |
| *F21W 131/20* | (2006.01) |

(56) References Cited

U.S. PATENT DOCUMENTS

| | | | |
|---|---|---|---|
| 2014/0078301 | A1 | 3/2014 | Fazzi et al. |
| 2014/0221728 | A1 | 8/2014 | Bodlaender et al. |
| 2015/0209598 | A1 | 7/2015 | Bhosale et al. |

FOREIGN PATENT DOCUMENTS

| | | |
|---|---|---|
| JP | 2002-153523 | 5/2002 |
| JP | 2003-525713 | 9/2003 |
| JP | 2010-207438 | 9/2010 |
| JP | 2014-200494 | 10/2014 |
| JP | 2015-528325 | 9/2015 |

OTHER PUBLICATIONS

Notification of Reasons for Refusal dispatched on Dec. 6, 2016 in corresponding Japanese Patent Application No. 2015-225488, with English translation.

* cited by examiner

INCUBATOR WITH ILLUMINATION

Priority is claimed on Japanese Patent Application No. 2015-225488, filed on Nov. 18, 2015, the content of which is incorporated herein by reference.

TECHNICAL FIELD

The present invention is related to an incubator with illumination.

BACKGROUND ART

JP 2010-207438 A discloses an incubator with a light source fixed to an outer surface of a ceiling of a newborn baby accommodating chamber, so as to emit light into the accommodating chamber.

SUMMARY OF INVENTION

Problem to be Solved

Generally, outer walls of the accommodating chamber, or accommodating space, is transparent, which enables observation of the newborn baby accommodated in the accommodating chamber from outside.

However, the light source fixed to the ceiling of the accommodating chamber may disturb the observation. Especially, the light source generating large heat is required to be attached with a heat radiator, which increases possibility of disturbance. Also, the light source and/or the heat radiator may increase a height of the incubator. Especially when the ceiling is able to be opened, this may make the ceiling heavy and thereby produce requirement of means for helping the opening. This may result in further increment in size of the incubator.

The light source generating large heat may cause increment of temperature in the accommodating chamber. Thus, it is preferable to be disposed outside the accommodating chamber. However, this may result in reflection of the light on the outer wall, such as the ceiling or the like, and thereby reduction of efficiency.

The present invention aims to solve such problems.

Means to Solve

An incubator according to the present invention includes: a transparent hood, covering an accommodating space configured to accommodate a baby; an illumination light source, disposed so as to avoid disturbing observation of the baby through the transparent hood; and an emitting member, fixed to the transparent hood, and configured to emit light from the illumination light source, so as to illuminate the accommodating space. This enables prevention of the illumination light source from disturbing observation.

The emitting member may be disposed inside the transparent hood. This enables to prevent reduction of efficiency.

The emitting member may be disposed at an upper part of the transparent hood. This enables restraint of shadow generation.

The incubator may further include a guiding member, fixed to the transparent hood, and configured to guide the light from the illumination light source to the emitting member. This enables to dispose the illumination light source apart from the emitting member.

The guiding member may be disposed at a side part of the transparent hood. The guiding member may be transparent. This enables to restrain the guiding member from disturbing the observation.

The incubator may further include a body, disposed under the accommodating space. The illumination light source may be fixed to the body. This enables to prevent the observation from being disturbed by the illumination light source and/or its accessories, such as wiring, a heat radiator, or the like. Also, this enables to miniaturize the incubator.

The transparent hood may be configured to be openable. The illumination light source may be configured to be turned off when the transparent hood is opened. This enables to prevent illumination toward unintended directions.

BRIEF DESCRIPTION OF DRAWINGS

Referring to the accompanying drawings, embodiments will be described in detail. The embodiments and the drawings are provided only for more complete understanding of the present invention. They are not intended to limit the present invention in any meanings.

EMBODIMENTS

Figure 1:
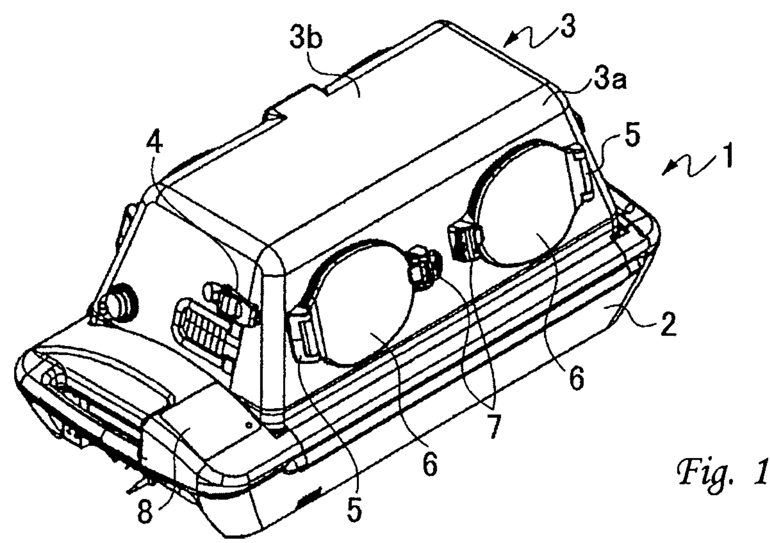
FIGS. 1 to 3 are a perspective view, a sectional side view and a partially expanded section view illustrating an example of an incubator.

As shown in FIG. 1, an incubator 1 may include a body 2 and a hood 3. The incubator 1 may be used for nursing of a baby, such as a newborn baby or the like.

Figure 2:
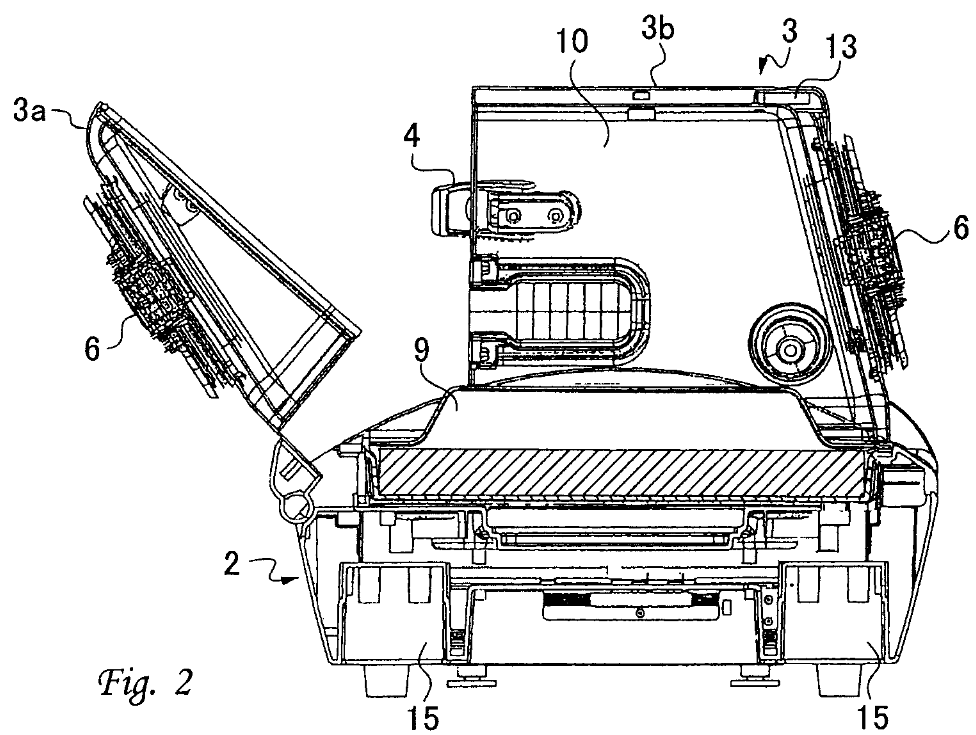

The body 2 may include a bed 9, shown in FIG. 2, with a mattress or the like, on which the baby is put.

The hood 3 covers above the body 2, to define an accommodating space 10 between the body 2 and the hood 3. The baby put on the body 2 is accommodated in the accommodating space, or nursing space, 10. The hood 3 is made of synthetic resins or the like, and transparent so as to enable observation of the baby from outside.

The body 2 may include various equipment, not shown, such as an oxygen concentration adjuster, an temperature adjuster, or the like, to adjust environment in the accommodating space 10 for the baby. The body 2 may include a console, or control board, 8 for control of the equipment.

The hood 3 may be openable. The hood 3 may be divided to a front hood 3*a* and a rear hood 3*b*. The front hood, or thin hood, 3*a* may mainly include a front side part of the hood 3, and be engaged to the body 2 by hinges or the like enabling forward rotation, as shown in FIG. 2, to open the accommodating space 10. The rear hood, or thick hood, 3*b* may mainly include left and right side parts, a rear side part, and an upper part, of the hood 3, and be engaged to the body 2 by hinges or the like enabling backward rotation to open the accommodating space 10. The hood 3 may include a clasp, or locking means, 4 for locking the front hood 3*a* and the rear hood 3*b* to inhibit them from being opened. The front hood 3*a* and the rear hood 3*b* may also be able to be removed from the body 2.

The hood 3 may also include windows for putting hands into the accommodating space 10 to access the baby without opening the front hood 3*a* or the rear hood 3*b*. The hood 3 may include doors 6 for closing the windows. Each of the doors 6 may be able to be rotated around a shaft 5 to be opened outward, and able to be locked by a latch, or locking part, 7 to be prevented from being opened. Each of the front hood 3*a* and the rear hood 3*b* may be provided with two windows to enable two operators to put their both hands into the incubator 1 from the front side and the rear side.

Figure 3:
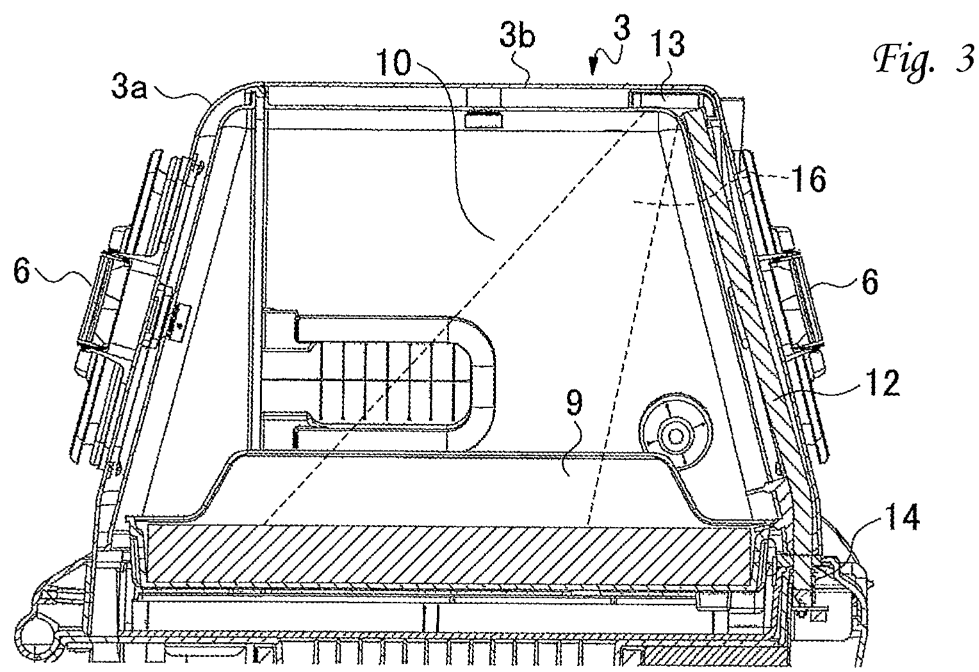
Figure 4:
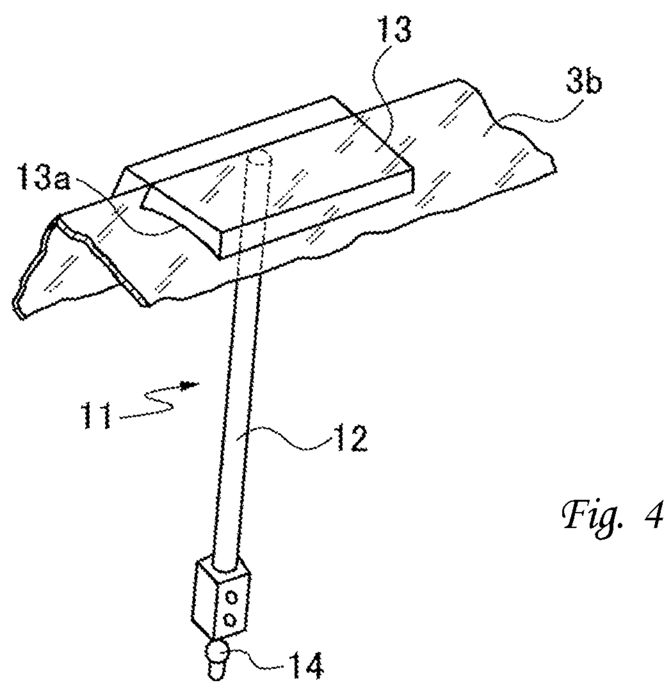
FIG. 4 is a perspective view illustrating an example of an illumination device.

The incubator 1 also includes an illumination device 11, shown in FIG. 4. The illumination device 11 emits light 16 in the accommodating space 10, as shown in FIG. 3, to illuminate the baby. The illumination device 11 may include a light source 14, a guiding member 12, and an emitting member 13.

The light source 14 emits light for illuminating the accommodating space 10. The light source 14 may include a light emitting diode or the like. This enables to make the light source 14 small, and to reduce its energy consumption. The light source 14 is disposed so as to avoid disturbing observation of the baby accommodated in the accommodating space 10 from outside through the hood 3. This enables appropriate treatment for the baby accommodated in the accommodating space 10, when needed.

The light source 14 may be fixed to the body 2. It may be disposed in the body 2. This enables to prevent increment in height of the incubator 1. The body 2 may include a recess for accommodating the light source 14 in it.

The illumination device 11 may include wiring for electrical connection between the light source 14 and an electrical power source, such as a battery 15, an alternating or direct current power supply, or the like. The illumination device 11 may include a heat radiator, such as a heat radiation plate, for radiation of heat from the light source 14. The light source 14 fixed to the body 2 enables prevention of the wiring and/or the heat radiator from disturbing the observation. Also, this enables to prevent increment of a weight of the hood 3, and thereby to facilitate opening and shutting of the hood 3. This eliminates requirement of means for helping the opening and shutting, and thereby enables reduction in size of the incubator 1. Further, this enhances design flexibility of the heat radiator, and thereby makes heat radiation design easy.

The guiding member 12 guides the light from the light source 14 to the emitting member 13. The guiding member 12 may include a light guide body with a rod shape or a plate shape, made of acrylic resin or the like, a bundle of optical fibers, or the like. The guiding member 12 may be disposed at a side part of the hood 3. The guiding member 12 may be disposed inside or outside the hood 3. The guiding member 12 may be fixed to the rear hood 3*b*. The guiding member 12 may be transparent when viewed from a direction intersecting one in which the light is guided. This enables restraint of the guiding member 12 from disturbing the observation.

The emitting member 13 emits the light from the light source 14 toward the accommodating space 10. The emitting member 13 is fixed to the hood 3. The emitting member 13 may be disposed to, preferably around the center of, an upper part of the hood 3. This enables restraint of generation of shadows of the operator's hands inserted from the windows to the accommodating space 10, or the like.

The emitting member 13 may be disposed inside the hood 3. This enables prevention of the light emitted from the emitting member 13 from being reflected on the outer surface of the hood 3.

The emitting member 13 may include a reflection plate for reflecting the light guided by the guiding member 12. The reflection plate may have a curved reflection surface. This enables efficient reflection of the light. The reflection plate may diffusely reflect the light. This enables soft illumination of the accommodating space 10.

The emitting member 13 may be configured by inward directing an distal end face of the guiding member 12, to directly emit the light guided by the guiding member 12 toward the accommodating space 10. The distal end face may diffuse the light.

The light source 14 may be configured to turn off when the hood 3 is opened. This enables prevention of the light emitted from the light source 14 or the emitting member 13 from illuminating toward unintended directions, even when opening of the hood 3 causes change of a direction of the emitting member 13 fixed to the hood 3, or blocks entering of the light emitted from the light source 14 into the guiding member 12. In a case that the emitting member 13 is fixed to the rear hood 3*b*, the light source 14 may be turned off only when the rear hood 3*b* is opened, but not when the front hood 3*a* is opened. This enables continuous illumination when the front hood 3*a* is opened.

The above described embodiments are examples to make it easier to understand the present invention. The present invention is not limited to the example, and includes any modified, altered, added, or removed variations, without departing from the scope of the claims attached herewith. This can be easily understood by persons skilled in the art.

REFERENCE SIGNS LIST

1: incubator; 2: body; 3: hood; 3*a*: front hood; 3*b*: rear hood; 4: clasp; 5: shaft; 6: door; 7: latch; 8: console; 9: bed; 10: accommodating space; 11: illumination device; 12: guiding member; 13: emitting member; 14: light source; and 15: battery.

The invention claimed is:

1. An incubator, comprising:

a body;

a transparent hood covering above the body;

an accommodating space, defined between the body and the transparent hood, and configured to accommodate a baby;

an illumination light source, disposed in the body so as to avoid disturbing observation of the baby through the transparent hood;

an emitting member, fixed to the transparent hood and disposed inside of the transparent hood at an upper part of the transparent hood, the emitting member being configured to emit light from the illumination light source, so as to illuminate the accommodating space; and a guiding member, fixed to the transparent hood and disposed at a side part of the transparent hood, the guiding member being configured to guide the light from the illumination light source to the emitting member, wherein the emitting member includes a reflection plate that is configured to reflect the light guided by the guiding member.

2. The incubator of claim 1, wherein the guiding member is transparent.

3. The incubator of claim 1, wherein the transparent hood is configured to be openable, and the illumination light source is configured to be turned off when the transparent hood is opened.

4. The incubator of claim 1, wherein the illumination light source includes a light emitting diode.

5. The incubator of claim 1, wherein the guiding member includes a light guide body with a rod shape or a plate shape, or a bundle of optical fibers.

6. An incubator, comprising:

a body;

a transparent hood, covering above the body, and openably engaged to the body;

an accommodating space, defined between the body and the transparent hood, and configured to accommodate a baby;

an illumination light source, disposed in the body;

a guiding member fixed to the transparent hood and disposed at a side part of the transparent hood; and an emitting member fixed to the transparent hood and disposed inside of the transparent hood at an upper part of the transparent hood, wherein when the transparent hood is closed, light from the illumination light source enters the guiding member, the guiding member guides the light to the emitting member, and the light guided by the guiding member is emitted from the emitting member into the accommodating space, and when the transparent hood is opened, the light from the illumination light source does not enter the guiding member, and the emitting member does not emit the light.

7. The incubator of claim 6, wherein the illumination light source is turned off when the transparent hood is opened.

8. The incubator of claim 6, wherein the illumination light source includes a light emitting diode.

9. The incubator of claim 6, wherein the guiding member includes a light guide body with a rod shape or a plate shape, or a bundle of optical fibers.

10. The incubator of claim 6, wherein the emitting member includes a reflection plate for reflecting the light guided by the guiding member.

* * * * *